J. HUMBRECHT.
ANNULAR MIRROR PERISCOPE.
APPLICATION FILED NOV. 24, 1911.

1,085,611.  Patented Feb. 3, 1914.

Witnesses:
Paul H. Frank
Le Roy Dalley

Inventor:
Jules Humbrecht
by
Brown, Raegener, Moody & Matter
Attys

UNITED STATES PATENT OFFICE.

JULES HUMBRECHT, OF GROSS-LICHTERFELDE, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

ANNULAR-MIRROR PERISCOPE.

1,085,611.  Specification of Letters Patent.  Patented Feb. 3, 1914.

Application filed November 24, 1911. Serial No. 662,109.

*To all whom it may concern:*

Be it known that I, JULES HUMBRECHT, a citizen of the German Empire, and resident of Gross-Lichterfelde, near Berlin, Germany, have invented certain new and useful Improvements in and Relating to Annular-Mirror Periscopes, of which the following is a specification.

This invention relates to an annular mirror periscope having a reflector and a negative lens device for producing a central image within the annular image of the annular mirror and consists in the provision of the reflector centrally to and in working position of the instrument below, that is to say, with regard to the path of the rays striking the annular mirror, behind the latter in combination with a negative lens in front of said reflector. This construction is especially advantageous for submarine boats in so far as no optical elements are required extending over the annular mirror and subjected to water pressure during the movement of the boat and a durable assembling of parts is easily secured.

Figure 1:
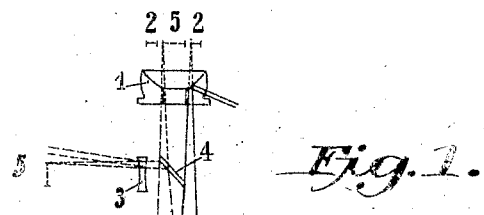
Figure 2:
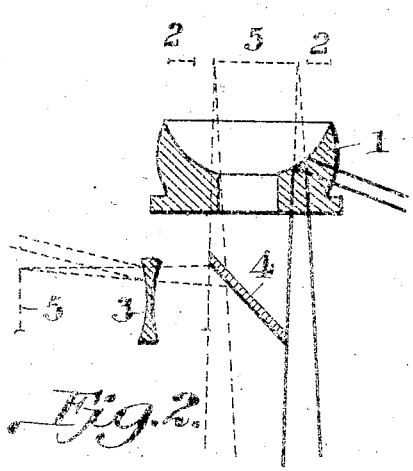

Figure 1 shows optical elements of a periscope in accordance with this invention. Fig. 2 is a detail view on an enlarged scale of a portion of the periscope shown in Fig. 1.

The annular mirror of the periscope is designated 1. A panoramic image such as would be produced by this annular mirror is indicated at 2.

3 is a negative lens and 4 a reflector both arranged below the annular mirror 1 and the reflector 4 concentrically thereto.

5 designates the image produced by the negative lens 3, the optical elements being so calculated that the images 2 and 5 are produced in the same plane.

6 is a lens system which collects the divergent rays coming from the images 2 and 5 and produces images in the image plane 7 which can be observed by an ocular 8.

9 designates a deviating prism.

What I claim is:—

In a periscope an annular mirror adapted to produce an annular panoramic image and a device for producing a central image within said annular panoramic image said device consisting of a reflector positioned centrally to and below the annular mirror and of a negative lens in front of said reflector and coöperating therewith.

In testimony whereof I have signed this specification in the presence of two subscribing witnesses.

JULES HUMBRECHT.

Witnesses:
  HENRY HASPER,
  WOLDEMAR HAUPT.